United States Patent
Conover et al.

(10) Patent No.: US 6,860,432 B2
(45) Date of Patent: Mar. 1, 2005

(54) OVERTEMPERATURE SAFETY CUTOFF DEVICE

(75) Inventors: James A. Conover, Snohomish, WA (US); George D. Davis, Bellevue, WA (US); Byron G. Scott, Arlington, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/303,221

(22) Filed: Nov. 25, 2002

(65) Prior Publication Data

US 2004/0099748 A1 May 27, 2004

(51) Int. Cl.[7] .............................................. G05D 23/08
(52) U.S. Cl. .................................. 236/93 R; 236/101 E
(58) Field of Search ............................ 236/93 R, 93 B, 236/101 E, DIG. 2

(56) References Cited

U.S. PATENT DOCUMENTS

| | | | | |
|---|---|---|---|---|
| 1,449,675 A | * | 3/1923 | Heiser ....................... | 236/93 R |
| 1,687,286 A | * | 10/1928 | Freer ........................... | 138/40 |
| 1,888,225 A | * | 11/1932 | Hetherington ............. | 236/93 R |
| 1,910,919 A | * | 5/1933 | Hetherington ............. | 236/93 R |
| 3,291,391 A | * | 12/1966 | Mesco ....................... | 236/93 R |
| 3,762,638 A | * | 10/1973 | Goldsmith ................. | 236/12.2 |
| 4,059,500 A | * | 11/1977 | Kamarian ................... | 204/288 |
| 4,146,048 A | | 3/1979 | McCabe | |
| 4,212,424 A | | 7/1980 | Fortune | |
| 4,262,844 A | * | 4/1981 | Sekiya ....................... | 236/48 R |
| 4,295,602 A | * | 10/1981 | Priesmeyer ............... | 236/93 B |
| 4,480,784 A | * | 11/1984 | Bennett ..................... | 236/93 B |
| 4,821,954 A | * | 4/1989 | Bowder ..................... | 236/48 R |
| 4,830,277 A | | 5/1989 | Hood | |
| 4,981,261 A | * | 1/1991 | Bergmann et al. ........ | 236/93 B |
| 5,209,399 A | * | 5/1993 | Gondusky et al. ........ | 236/93 R |
| 5,586,722 A | * | 12/1996 | Murray ..................... | 236/93 B |

FOREIGN PATENT DOCUMENTS

| | | |
|---|---|---|
| DE | 4318442 | 12/1994 |
| GB | 259469 | 10/1926 |
| GB | 2124339 | 2/1984 |
| WO | WO 0121323 | 3/2001 |

* cited by examiner

Primary Examiner—William E. Tapolcai
(74) Attorney, Agent, or Firm—Honeywell Int'l Inc.

(57) ABSTRACT

A fluid flow shutoff device that eliminates exposure to scalding hot water. The device includes a housing with a first and second opening for allowing fluid flow from the first to the second opening and a bimetallic element supported within the housing. When temperature of fluid flowing through the housing passes a threshold temperature, the bimetallic element changes shape causing stoppage of fluid flowing through the housing. The device further includes a flapper valve that is activated by the bimetallic element. When the element changes shape, the flapper valve is repositioned within the housing to stop fluid flow.

9 Claims, 2 Drawing Sheets

OVERTEMPERATURE SAFETY CUTOFF DEVICE

BACKGROUND OF THE INVENTION

Scalding due to extreme high temperature water out of a faucet is a serious problem that results in many injuries each year, especially involving children. A primary source of scalding is from a hot water heater that is set too high. The simple solution would be to reduce the temperature of the hot water heater to prevent these injuries. However, this is not happening and many scaldings still occur.

Therefore, there exists an unmet need for reducing scalding from high temperature water.

SUMMARY OF THE INVENTION

The present invention provides a fluid flow shutoff device that eliminates exposure to scalding hot water. The device includes a housing with a first and second opening for allowing fluid flow from the first to the second opening and a bimetallic element supported within the housing. When temperature of fluid flowing through the housing passes a threshold temperature, the bimetallic element changes shape causing stoppage of fluid flowing through the housing.

In an aspect of the invention, the device further includes a flapper valve that is activated by the bimetallic disk. When the element changes shape, the flapper valve is positioned within the housing to stop fluid flow.

In another aspect of the invention, the bimetallic element is plated to provide corrosion protection, such as electroless nickel or Teflon nickel.

In still another aspect of the invention, the first or second openings include internal or external threads for attaching to other threaded pipes or fittings.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1A:
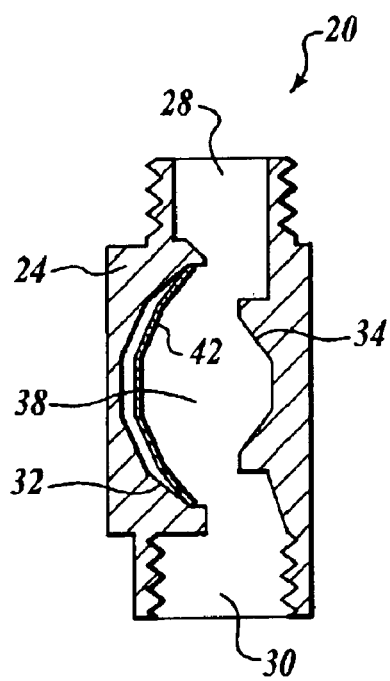
FIGS. 1A and B illustrate a first embodiment of an overtemperature safety cutoff switch formed in accordance with the present invention.
Figure 1B:
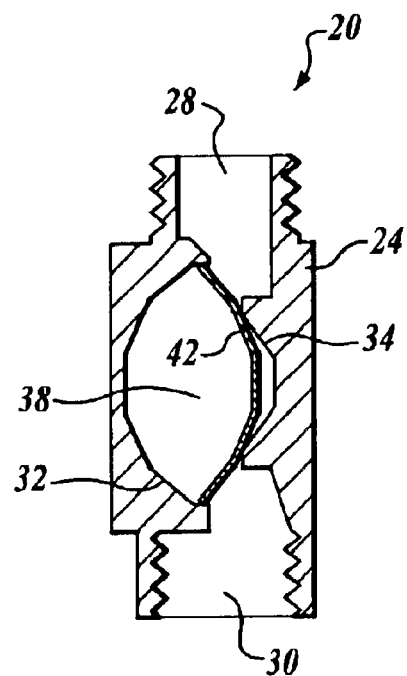

FIGS. 1A and B illustrate a first embodiment of an overtemperature safety water cutoff device 20. The device 20 includes a housing 24 with a receiving end 28 and an exhaust end 30. The receiving end 28 and the exhaust end 30 suitably include interior or exterior threads for allowing attachment to other devices, such as without limitation a faucet head, hose, or threaded pipe. The housing 24 includes a cavity 38 having first and second interior walls 32 and 34. The first wall 32 is opposite from the second wall 34. The first wall 32 receives and supports a bimetallic element (such as without limitation a disk, coil, or strip, hereinafter "disk") 42.

When temperature of a fluid that passes through the cavity 38 is below a threshold temperature for the bimetallic disk 42, the disk 42 maintains a close relationship with the first wall 32 (FIG. 1A), thereby allowing fluid to freely flow from the receiving end 28 to the exhaust end 30. When the temperature of the fluid that passes through the cavity 38 is above the threshold temperature of the bimetallic disk 42, the disk 42 changes shape or snaps into a position where it is supported at its ends by the first wall 32 of the cavity 38 and is in contact with the second wall 34, thereby blocking fluid flowing through the cavity 38.

Figure 2A:
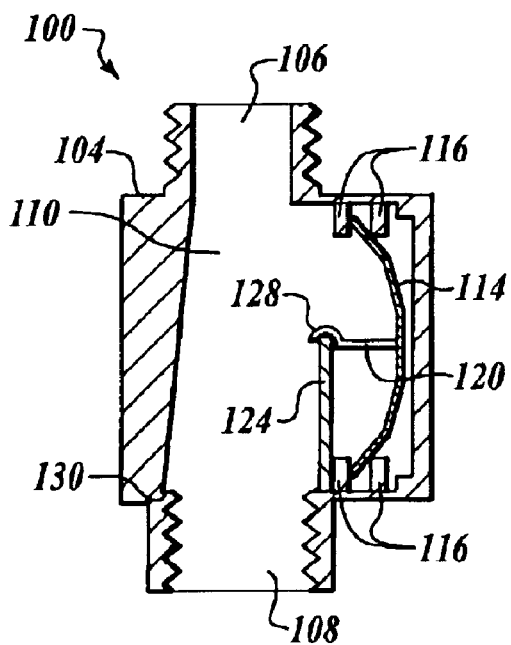
FIGS. 2A and B illustrate a second embodiment of an overtemperature safety cutoff switch formed in accordance with the present invention.

FIGS. 2A and B illustrate a second embodiment of a device 100 that automatically shuts off fluid that exceeds a predefined temperature. The device 100 includes a housing 104 that forms a cavity 110. The housing 104 includes a fluid receiving opening 106 and a fluid exhaust opening 108 at opposite ends of the housing 104. The fluid receiving opening 106 and the fluid exhaust opening 108 suitably include interior or exterior threads for allowing attachment to other devices, such as without limitation a faucet head, hose, or threaded pipe. A bimetallic disk 114 is suitably held within the cavity 110 by support gates 116. Attached approximately to the center of the bimetallic disk 114 is a hook arm 120 that extends from the bimetallic disk 114 into approximately the center of the cavity 110.

Figure 2B:
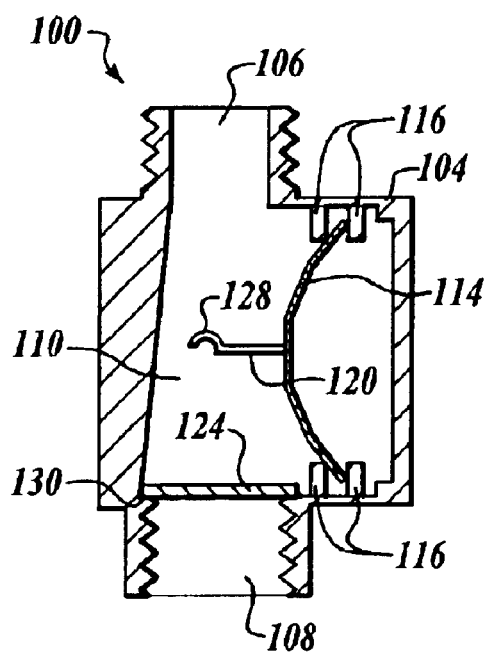

When fluid that is received by the receiving opening 106 is below a threshold temperature of the disk 114, the bimetallic disk 114 is concave relative to the cavity 110, see FIG. 2A. Also, a hook 128 at one end of the hook arm 120 supports a flapper valve 124 that is hingedly attached to a wall of the cavity 110 near the exhaust opening 108. The flapper valve 124 is supported so that fluid flow through the cavity 110 is not impeded. As shown in FIG. 2B, when the disk 114 senses the temperature of the fluid has exceeded the threshold value, the bimetallic disk 114 changes shape or snaps from concave to convex, thereby moving the hook arm 120 closer to a second side of the cavity 110, and releasing the flapper valve 124. When the flapper valve 124 is released, the force of fluid through the cavity 110 forces the valve 124 to rotate on its hinge and make contact with a ledge 130 opposite the hinged attachment of the exhaust opening 108. When the valve 124 makes contact with the ledge 130, the valve 124 blocks the exhaust opening 108, thereby stopping fluid flow.

The disks in the two above embodiments are suitably thinly coated on at least one side with a corrosion protective coating, such as without limitation electroless nickel plating or Teflon nickel plating. The coating keeps the disk from corroding.

It will be appreciated that the threshold temperature for the bimetallic disk can be set to toggle at a temperature below the normal temperature of fluid flowing through the device. In other words the bimetallic disk can cause fluid shutoff, if the fluid becomes too cold.

It will be appreciated that ends of the overtemperature safety water cutoff device can be a solderable connecting piece. Also, the overtemperature safety water cutoff device and the ends can be constructed of brass, PVC, or other plastic or metal piping materials.

While the preferred embodiment of the invention has been illustrated and described, as noted above, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

1. A fluid flow shutoff device comprising:
   a housing with a first and second opening for allowing fluid flow from the first to the second opening; and
   a bimetallic disk element supported within the housing, when temperature of fluid flowing through the housing passes a threshold temperature, the bimetallic disk element impedes fluid flowing through the housing, the bimetallic disk element having a continuous planar surface, wherein a normal of the planar surface of the bimetallic disk element is approximately perpendicular to a longitudinal axis of the housing.

2. The device of claim 1, wherein the device further comprises a flapper valve that is activated by the bimetallic disk element.

3. The device of claim 1, wherein the bimetallic disk element includes a coating for corrosion protection.

4. The device of claim 3, wherein the coating is at least one of electroless nickel or Teflon nickel.

5. The device of claim 1, wherein the first or second openings include threads.

6. The device of claim 5, wherein the threads being at least one of interior or exterior threads.

7. The device of claim 1, wherein the first and second openings include solderable connections.

8. The device of claim 1, wherein the housing includes at least one of copper or plastic.

9. A method for automatically shutting off flow of a fluid through a pipe when the fluid surpasses a threshold temperature, the method comprising:

sensing the temperature of fluid flowing through the pipe; and shutting off fluid flowing through the pipe using a bimetallic disk element in response to the sensed temperature passing a threshold temperature of the bimetallic disk element, the bimetallic disk element having a continuous planar surface, wherein a normal of the planar surface of the bimetallic disk element is approximately perpendicular to a longitudinal axis of the pipe.

* * * * *